United States Patent
Ojeda

(10) Patent No.: US 8,166,563 B2
(45) Date of Patent: Apr. 24, 2012

(54) REMANUFACTURE OF ENCRYPTED CONTENT USING A REPLICATED MEDIUM

(75) Inventor: Ruben Ojeda, Hialeah, FL (US)

(73) Assignee: Eclipse Data Technologies, Pleasanton, CA (US)

(*) Notice: Subject to any disclaimer, the term of this patent is extended or adjusted under 35 U.S.C. 154(b) by 950 days.

(21) Appl. No.: 12/173,745

(22) Filed: Jul. 15, 2008

(65) Prior Publication Data

US 2010/0014665 A1 Jan. 21, 2010

(51) Int. Cl.
*G06F 21/00* (2006.01)
(52) U.S. Cl. .......................................... 726/27; 705/59
(58) Field of Classification Search .......... 380/200–202, 380/228, 229; 726/2, 21, 26–33; 705/57–59
See application file for complete search history.

(56) References Cited

U.S. PATENT DOCUMENTS

| | | | | |
|---|---|---|---|---|
| 7,853,802 B2* | 12/2010 | Soda et al. | ............. | 713/189 |
| 2001/0038694 A1* | 11/2001 | Senshu | ............. | 380/201 |
| 2004/0039916 A1* | 2/2004 | Aldis et al. | ............. | 713/177 |
| 2004/0078336 A1* | 4/2004 | Asadu | ............. | 705/51 |
| 2006/0265338 A1* | 11/2006 | Rutkowski et al. | ............. | 705/71 |
| 2006/0272026 A1* | 11/2006 | Niwano et al. | ............. | 726/27 |
| 2007/0074020 A1* | 3/2007 | Nishimura | ............. | 713/168 |

* cited by examiner

*Primary Examiner* — Gilberto Barron, Jr.
*Assistant Examiner* — David Le

(57) ABSTRACT

Embodiments of the invention provide a method for creating a source for remanufacture of encrypted content using a replicated medium. A content encrypting engine obtains a first set of meta data from a multimedia content and stores the first set of meta data in a database. A content encrypting engine obtains a second set of meta data from a signed encrypted version of the multimedia content, and stores the second set of meta data in the database. An encrypted replica duplication engine then extracts encrypted data from a first replicated medium, and combines the encrypted data with the first set of meta data and the second set of meta data. Advantageously, embodiments of the invention allow a manufacturer or replication facility to use a replica disc, which is inexpensive and abundant, as a data archive for source material.

27 Claims, 3 Drawing Sheets

REMANUFACTURE OF ENCRYPTED CONTENT USING A REPLICATED MEDIUM

BACKGROUND OF THE INVENTION

1. Field of the Invention

The present invention relates generally to the field of optical storage media and, more particularly, to a method and apparatus for remanufacture of encrypted content using a replicated medium.

2. Description of the Related Art

Optical storage media, such as Compact Disc (CD), Digital Versatile Disc (DVD), High-Definition Digital Versatile Disc (HD DVD), and Blu-ray Disc (Blu-ray or BD), may be used for various purposes. For example, optical storage media may be used to store video, audio, and/or data information. Large-scale reproduction of optical storage media is known as replication, and is generally performed in a replication facility.

Using prior art techniques, in order to create a HD DVD or BD replica disc, original content is provided to the replication facility as an authored image. For example, the original content may be provided as a Cutting Master Format (CMF) image.

The original content may be provided to the replication facility in either an encrypted or an unencrypted form. If the original content is unencrypted, encryption is performed on the content, according to encryption specifications, using encryption keys generated by encryption software. Alternatively, the CMF image may already be encrypted when provided to the replication facility.

Once the content is encrypted, the content is ready to be "signed." For example, a license authority may provide a signed certificate that is then embedded into the image. The encrypted and signed content is written onto a master digital recording source, typically formed of glass, using a laser recording system. The glass master is then used to create metal stampers, which are in turn used in an injection molding process to create replica optical storage media.

Several problems exist with the current replication process. If original content providers want additional copies of the replicated media after the initial large-scale production, then the replication facility is contacted to make the additional copies. However, the replication facility may not have saved the original content. Also, even if the replication facility did save the original content, the content is not signed and would need to be re-signed by the licensing authority, which introduces significant fees. Furthermore, the replication facility may not simply feed a signed and encrypted replica into the front end of the replication process, as this may violate the terms of duplication license agreements.

SUMMARY OF THE INVENTION

Embodiments of the invention provide a method for creating a source for remanufacture of encrypted content using a replicated medium. A content encrypting engine obtains a first set of meta data from a multimedia content and stores the first set of meta data in a database. A content encrypting engine obtains a second set of meta data from a signed encrypted version of the multimedia content, and stores the second set of meta data in the database. An encrypted replica duplication engine then extracts encrypted data from a first replicated medium, and combines the encrypted data with the first set of meta data and the second set of meta data.

Advantageously, embodiments of the invention allow a manufacturer or replication facility to use a replica disc, which is inexpensive and abundant, as a data archive for source material.

BRIEF DESCRIPTION OF THE DRAWINGS

So that the manner in which the above recited features of the invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

In one embodiment, a method and apparatus for remanufacture of encrypted content using a replicated medium is described. The invention is illustratively described in the context of remanufacturing an HD DVD or BD optical medium. Those skilled in the art, however, will appreciate that the present invention may be used to remanufacture other types of optical storage media, such as CD media, DVD media, or any other format of optical media, including those not yet known.

Figure 1:
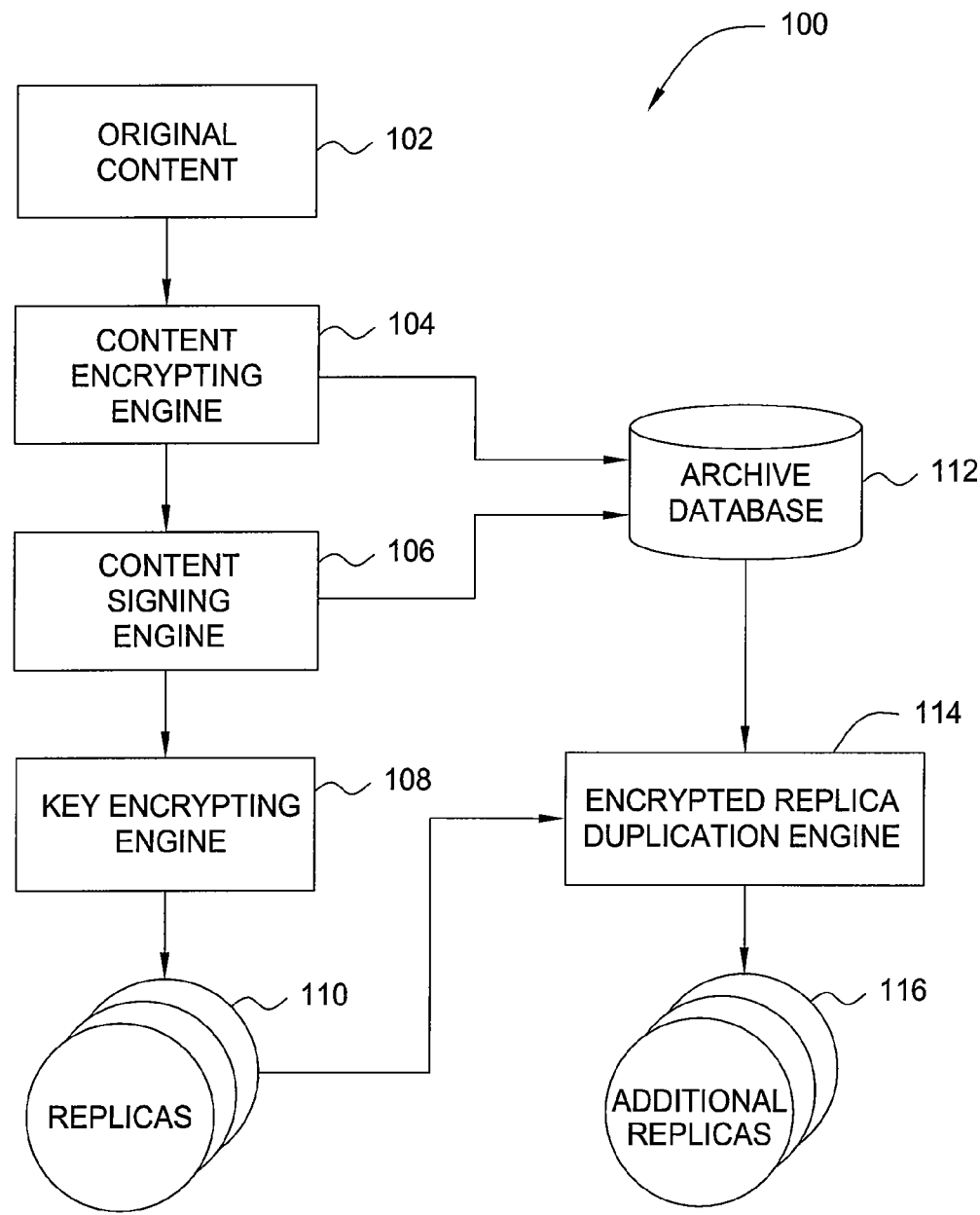
FIG. 1 is a block diagram illustrating components of a system configured to implement one or more aspects of the present invention.

In one embodiment, FIG. 1 is a block diagram illustrating components of a system 100 configured to implement one or more aspects of the present invention. As shown, the system 100 includes original content 102, a content encrypting engine 104, a content signing engine 106, a key encrypting engine 108, replicas 110, an archive database 112, an encrypted replica duplication engine 114, and additional replicas 116.

The original content 102 (e.g., movies, videos, and the like) may be received from an authoring house that created the content (broadly defined as multimedia content). For example, the authoring house may be a motion picture studio. In one embodiment, the original content 102 may be an image created by an authoring software. Various methods are known to verify the data created by the authoring software to ensure that it is free from errors. In another embodiment, the original content 102 may be provided to the replication facility as a Cutting Master Format (CMF) image. A CMF image is a set of data files used to deliver content to an optical disc manufacturing facility that includes data to be recorded on an optical disc and additional manufacturing control information.

As described above, the original content 102 may be unencrypted. If the original content 102 is unencrypted, the content encrypting engine 104 encrypts the original content 102 according to one or more encryption specifications. For example, encryption keys used in the encryption process can be generated by the content encrypting engine 104, and during the encryption process, the encryption keys can be stored in the archive database 112. If the original content 102 is encrypted, the content encrypting engine determines the encryption keys (e.g., the encryption keys may be provided by the entity that provided the encrypted content) and stores the encryption keys in the archive database 112.

In one embodiment, the encrypted content is sent to a licensing authority that provides a content certificate for the encrypted content. In one embodiment, the content certificate is a cryptographically signed file that resides on a protected disc. The content certificate identifies the content on the disc using cryptographic hash values of the audio visual contents on the disc. As part of the production process, a replicator will generate an unsigned content certificate which is sent to the licensing authority so that a secure digital signature can be added. This signed content certificate is then returned to the replicator and is added to the content. Licensed playback devices must verify that the digital signature and hash values are correct before content can be played. The licensing authority generally charges a fee for the content certificate. After the content certificate is returned from the licensing authority, the content signing engine 106 embeds the content certificate into the encrypted image to create signed encrypted content. In one embodiment, the content signing engine 106 stores the content certificate into the archive database 112. In another embodiment, additional keys are returned from the licensing authority. For example, a media key block (MKB) may be introduced into the image by the licensing authority at this point in the process for the Blu-ray format. These additional keys are also embedded into the image and stored into the archive database 112.

In one embodiment, when replicating certain optical media formats, the encryption key used by the content encrypting engine 104 can also be encrypted by the key encrypting engine 108 to provide additional security. Thus, the signed encrypted content, optionally including encrypted encryption keys, is then used to create replicas 110. For example, replicas 110 may be the discs purchased by consumers as HD DVD or BD discs.

In one embodiment, the replicas 110 can be used to create additional replicas 116. The encrypted replica duplication engine 114 extracts the signed encrypted content, including an encrypted key, from the replica 110. In one embodiment, the data extracted from the replica 110 is not decrypted, which may violate duplication license agreements in certain scenarios. The extracted encrypted key is used as a pointer to reference archive data associated with the replica 110 that is stored in the archive database 112. In one embodiment, the data stored in the archive database 112 is unencrypted because it was stored pre-production, e.g., before the replicas 110 were created. The encrypted replica duplication engine 114 then restores the complete CMF image/source by associating the extracted encrypted content with the archive data, including the content certificate and various encryption keys, to recreate the signed encrypted image. The restored image/source may then be used to create additional replicas 116.

Figure 2:
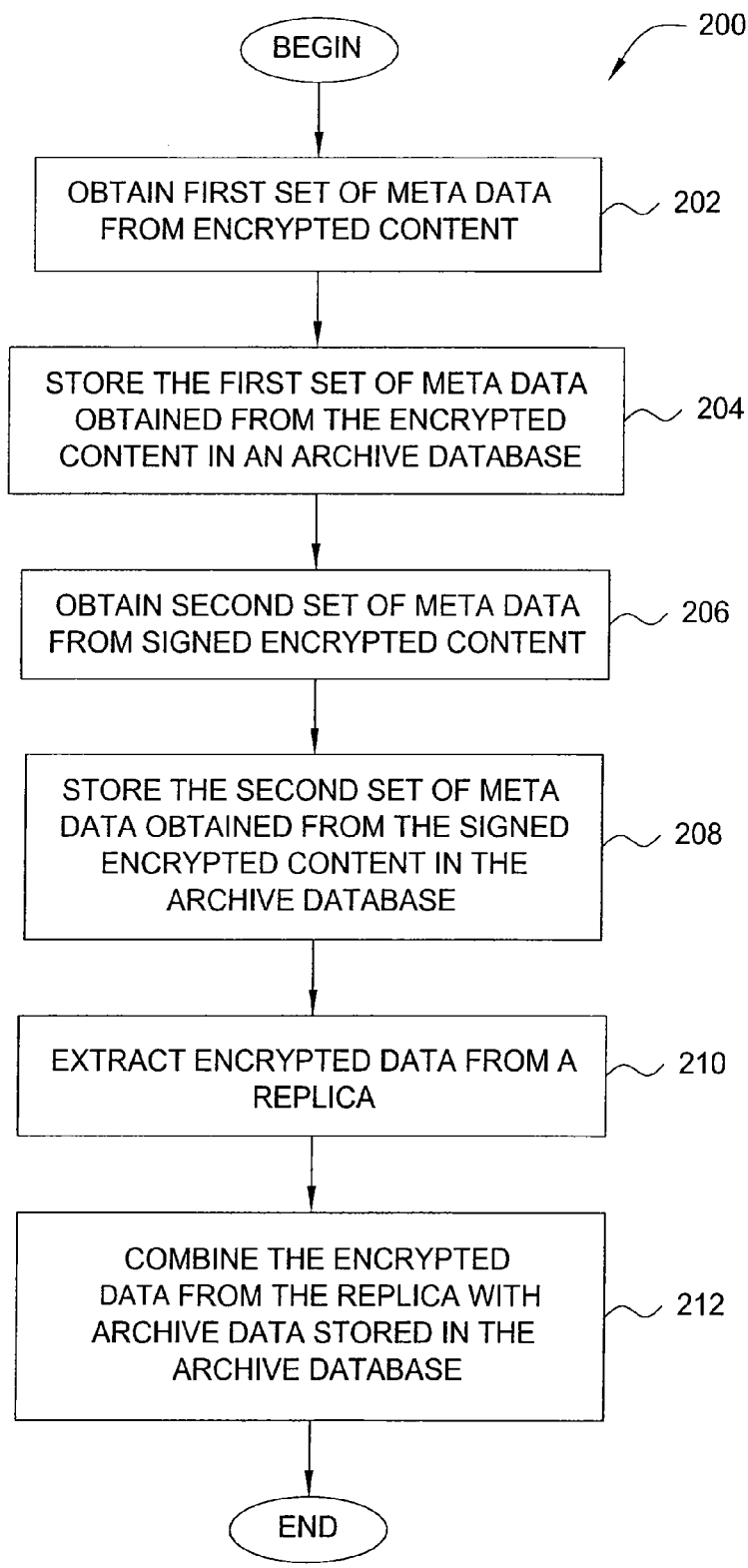
FIG. 2 is a flow diagram of an illustrative method for remanufacture of encrypted content using a replicated medium, according to one embodiment of the invention.

FIG. 2 is a flow diagram of an illustrative method 200 for remanufacture of encrypted content using a replicated medium, according to one embodiment of the invention. Persons skilled in the art will understand that, even though the method 200 is described in conjunction with the systems of FIG. 1, any system configured to perform the steps of the method 200 illustrated in FIG. 2, in any order, is within the scope of the present invention.

As shown, the method 200 begins at step 202, where the content encrypting engine 104 obtains a first set of meta data from the encrypted content. As described above, the encrypted content may be created by a content encrypting engine 104. In one embodiment, the first set of meta data may include encryption keys used to encrypt the encrypted content. For example, in the case of the HD DVD format, the first set of meta data may include a title key (TK), a content identifier or a volume ID (VID), and/or a media key block (MKB). Alternatively, in the case of the Blu-ray format, the first set of meta data may include the TK, but not the VID or the MKB.

At step 204, the content encrypting engine 104 stores the first set of meta data obtained from the encrypted content (or directly from the content-providing entity) in an archive database 112. As described above, the first set of meta data may include the TK, the VID, and/or the MKB. In one embodiment, the content encrypting engine 104 stores the first set of meta data into the archive database 112. In another embodiment, the encrypted replica duplication engine 114 stores the first set of meta data into the archive database 112.

At step 206, the content signing engine 106 obtains a second set of meta data from the signed encrypted content. As described above, the signed encrypted content may include an embedded content certificate received from a licensing authority. In one embodiment, the second set of meta data may include the content certificate embedded in the signed encrypted content. In another embodiment, the MKB may be introduced into the signed encrypted image with the content certificate, as is the case of the Blu-ray format. Thus, the second set of meta data may include the content certificate and/or the MKB.

At step 208, the content signing engine 106 stores the second set of meta data obtained from the signed encrypted content in the archive database 112. As described above, the second set of meta data may include the content certificate and/or the MKB. In one embodiment, the content signing engine 106 stores the second set of meta data into the archive database 112. In another embodiment, the encrypted replica duplication engine 114 stores the second set of meta data into the archive database 112.

At step 210, the encrypted replica duplication engine 114 extracts encrypted data from a replica disc. As described above, the encrypted data is not decrypted by the encrypted replica duplication engine 114. Namely, the media content, e.g., movie, video, will not be decrypted. The extracted encrypted data may also include an encrypted key. For example, the encrypted key may be an encrypted TK. The encrypted key may then be used as a pointer to reference the archive database that stores the first and second sets of meta data used to create the replica disc.

At step 212, the encrypted replica duplication engine 114 combines the encrypted data from the replica disc with archive data stored in the archive database. In one embodiment, the archive data may include the first and second sets of meta data. In one embodiment, the combined data may then be used to create a single data file that is suitable as a master data source for the manufacturing process. In one embodiment, each of the steps of method 200 is done in compliance with duplication license agreements.

Figure 3:
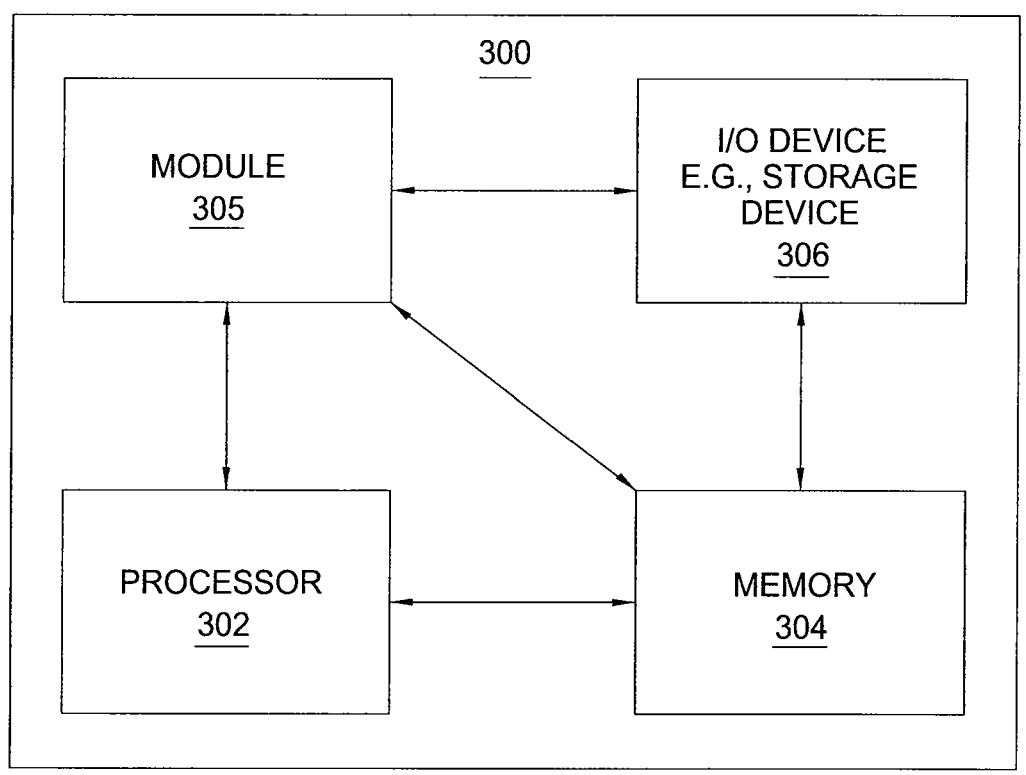
FIG. 3 depicts a high level block diagram of a general purpose computer suitable for use in performing the functions described herein.

FIG. 3 depicts a high level block diagram of a general purpose computer suitable for use in performing the functions described herein. As shown, system 300 comprises a processor element 302 (e.g., a CPU), a memory 304, e.g., random access memory (RAM) and/or read only memory (ROM), a module 305 for remanufacture of encrypted content using replicated media, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device such as a keyboard, a keypad, a mouse, and the like).

It should be noted that the present invention can be implemented in software and/or in a combination of software and hardware, e.g., using application specific integrated circuits (ASIC), a general purpose computer or any other hardware equivalents. In one embodiment, the encrypted replica duplication engine module or process 305 can be loaded into memory 304 and executed by processor 302 to implement the functions as discussed above. As such, the present encrypted replica duplication process 305 (including associated data structures) of the present invention can be stored on a computer-readable medium or carrier. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

One advantage of the systems and methods included herein is that they allow a manufacturer or replication facility to use a replica disc, which is inexpensive and abundant, as a data archive for source material. Using a replica disc as the data archive will save a significant amount of time and expense compared to current data archiving methods because the image/source does not need to be re-signed by the licensing authority. Additionally, the systems and methods included herein solve a management problem for manufacturers concerning how to archive content, encryption keys, and content certificates.

While the foregoing is directed to embodiments of the present invention, other and further embodiments of the invention may be devised without departing from the basic scope thereof. Therefore, the scope of the present invention is determined by the claims that follow.

The invention claimed is:

1. A method for creating a source for remanufacture of encrypted content using a replicated medium, comprising:
    obtaining a first set of meta data from a multimedia content;
    storing the first set of meta data in a database;
    obtaining a second set of meta data from a signed encrypted version of the multimedia content;
    storing the second set of meta data in the database;
    extracting encrypted data from a first replicated medium; and
    combining the encrypted data with the first set of meta data and the second set of meta data.

2. The method of claim 1, wherein the first set of meta data comprises a title key.

3. The method of claim 2, wherein the first set of meta data further comprises at least one of a content identifier or a media key block.

4. The method of claim 1, wherein the second set of meta data comprises a content certificate.

5. The method of claim 4, wherein the step of combining creates the signed encrypted version of the multimedia content by embedding the content certificate with the multimedia content.

6. The method of claim 5, wherein the content certificate is provided by a licensing authority.

7. The method of claim 4, wherein the second set of meta data further comprises a media key block.

8. The method of claim 1, wherein the encrypted data is not decrypted.

9. The method of claim 1, wherein the encrypted data comprises an encrypted key that is used to reference the first set of meta data and the second set of meta data stored in the database.

10. A non-transitory computer-readable medium storing instructions, that when executed by a processor, cause a computing device to create a source used for remanufacture of encrypted content using a replicated medium, by performing the step of:
    obtaining a first set of meta data from a multimedia content;
    storing the first set of meta data in a database;
    obtaining a second set of meta data from a signed encrypted version of the multimedia content;
    storing the second set of meta data in the database;
    extracting encrypted data from a first replicated medium; and
    combining the encrypted data with the first set of meta data and the second set of meta data.

11. The non-transitory computer-readable medium of claim 10, wherein the first set of meta data comprises a title key.

12. The non-transitory computer-readable medium of claim 11, wherein the first set of meta data further comprises at least one of a content identifier or a media key block.

13. The non-transitory computer-readable medium of claim 10, wherein the second set of meta data comprises a content certificate.

14. The non-transitory computer-readable medium of claim 13, wherein the combining creates the signed encrypted version of the multimedia content by embedding the content certificate with the multimedia content.

15. The non-transitory computer-readable medium of claim 14, wherein the content certificate is provided by a licensing authority.

16. The non-transitory computer-readable medium of claim 13, wherein the second set of meta data further comprises a media key block.

17. The non-transitory computer-readable medium of claim 10, wherein the encrypted data is not decrypted.

18. The non-transitory computer-readable medium of claim 10, wherein the encrypted data comprises an encrypted key that is used to reference the first set of meta data and the second set of meta data stored in the database.

19. An apparatus for creating a source used for remanufacture of encrypted content using a replicated medium, comprising:
    a database;
    a processor configured to execute:
        a content encrypting engine that is configured to:
            obtain a first set of meta data from a multimedia content, and
            store the first set of meta data in a database;
        a content encrypting engine that is configured to:
            obtain a second set of meta data from a signed encrypted version of the multimedia content, and
            store the second set of meta data in the database; and
        an encrypted replica duplication engine that is configured to:
            extract encrypted data from a first replicated medium, and
            combine the encrypted data with the first set of meta data and the second set of meta data.

20. The apparatus of claim 19, wherein the first set of meta data comprises a title key.

21. The apparatus of claim 20, wherein the first set of meta data further comprises at least one of a content identifier or a media key block.

22. The apparatus of claim 19, wherein the second set of meta data comprises a content certificate.

23. The apparatus of claim 22, wherein the encrypted replica duplication engine is further configured to combine the encrypted data with the first set of meta data and the second set of meta data by creating the signed encrypted version of the multimedia content by embedding the content certificate with the multimedia content.

24. The apparatus of claim 23, wherein the content certificate is provided by a licensing authority.

25. The apparatus of claim 22, wherein the second set of meta data further comprises a media key block.

26. The apparatus of claim 19, wherein the encrypted data is not decrypted.

27. The apparatus of claim 19, wherein the encrypted data comprises an encrypted key that is used to reference the first set of meta data and the second set of meta data stored in the database.

* * * * *